Figures 1, 2, 3:
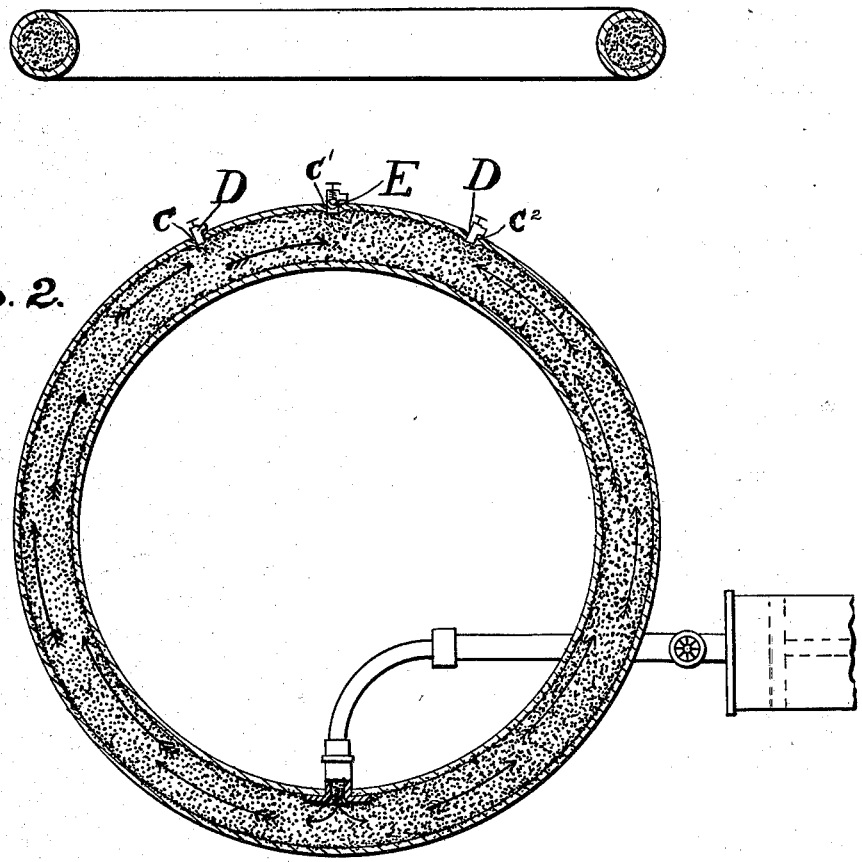

No. 738,566. PATENTED SEPT. 8, 1903.
C. D. NIRDLINGER.
VEHICLE TIRE AND METHOD OF MANUFACTURING SAME.
APPLICATION FILED NOV. 22, 1902.
NO MODEL.

WITNESSES:
INVENTOR
BY
Attorney

No. 738,566. Patented September 8, 1903.

UNITED STATES PATENT OFFICE.

CLARENCE DAWSON NIRDLINGER, OF ST. LOUIS, MISSOURI.

VEHICLE-TIRE AND METHOD OF MANUFACTURING SAME.

SPECIFICATION forming part of Letters Patent No. 738,566, dated September 8, 1903.

Application filed November 22, 1902. Serial No. 132,475. (No model.)

*To all whom it may concern:*

Be it known that I, CLARENCE DAWSON NIRDLINGER, a citizen of the United States, residing at St. Louis, in the State of Missouri, have invented certain new and useful Improvements in Vehicle-Tires and Methods of Manufacturing Same, of which the following is a specification, reference being had therein to the accompanying drawings.

This invention relates to improvements in vehicle-tires, the object being to provide a tire having the advantages of the ordinary pneumatic tire and which shall be free from the disadvantages incident to articles of that sort.

It relates also to a novel composition of matter adapted to serve as a filling material for a tire having an exterior sheathing.

I produce a tire which has an exterior tube, preferably of rubber, and an interior chamber initially empty, but which when the tire is completed is filled with a yielding elastic filler of such nature and introduced in such way that the filling mass and the exterior tube become practically incorporated one with the other and inseparable one from the other.

The invention also relates to an improved method of filling an exterior tube or sheathing with a viscid or semiviscid material capable of subsequently hardening.

Figure 1 is a side view of a tire embodying my improvements and made in the novel way I have devised. Fig. 2 is a vertical section. Fig. 3 is a cross-section.

The ingredients which I use to form a mass of the filling material are glucose, glue, glycerin, tannin, formaldehyde, and water. The ultimately-resulting mass contains these in substantially the following proportions, to wit: one-third of a pound of glucose, one-fourth of a pound of glue, somewhat less than one-half—say five-twelfths—of a pound of glycerin, one-fortieth of an ounce of tannin, one-fifteenth of an ounce of formaldehyde, and one-third of an ounce of water. I do not mean that exactly these relative proportions are essential to the invention, for there can be more or less modification in that respect without departing from the characteristic features, nor do I mean that all of these substances are brought together at once, for, as it will be seen below, the ultimate and complete compound is produced more or less gradually.

The following will furnish to one acquainted with such matters an understanding of one course of procedure which can be followed. A mass of liquid glue is provided by mixing one pound of hard glue with one pound of water in such quantities as are desirable, the mixture preferably being allowed to rest for half a day. A mass of glycerin is placed in a tank and heated for about half an hour, and then glue such as above provided is added in the proportion herein set forth of quarter of a pound of the glue to five-twelfths of a pound of glycerin, and after they are brought together they are slowly stirred for half an hour. Glucose in a liquid state is then added, about one-third of a pound to a quarter of a pound of the glue, and this mixture is slowly stirred for a brief period of a few minutes. Then tannin is introduced in approximately the proportions indicated, and the stirring is continued for a further short period. A solution of formaldehyde and water (one part of the former and five of the latter) is then added to the mixture, after which the stirring action is continued for a sufficient time—say one hour.

The rubber sheathing or tube of the tire should first be rinsed or flushed with a solution of formaldehyde, this preventing the starting of fermentation in any of the ingredients of the filler, the formaldehyde acting here in relation to the rubber sheathing as it does in the filling mixture as a destroyer of the germs or the like, which cause fermentation and insures that the filling mass shall become thoroughly incorporated with the interior part of the rubber and that the union of the two bodies shall remain firm, so that there will not occur that result which has made tire-fillers of earlier sorts inoperative—namely, the loosening and separating of the filler from the rubber sheath. After the rubber tube or sheathing has been thus treated the valve-tube is connected with the vessel or receiver that holds the filling material and the filler is introduced, the tube being held at this time in the position shown in the drawings. The filling material is forced into the rubber by a body of air under suitable pressure, preferably about eighty pounds. It enters at the lower part of the tube and rises to the upper part. In order to let the air escape from the interior and to assure that every part of the interior chamber be completely filled, I form three minute apertures, as shown at C C' C². Into each of these I fit a short tube D with an escape-valve at E, the tubes being connected by a duct, if desired, for conveying away from the tire any mixture that may overflow. The air escapes at these orifices and through the valves and the formation of any interior air-cells is prevented. The filling material reaches every part of the interior chamber and becomes firmly incorporated with the interior surface and over every part thereof. By having not only the top air-escape at C, but also those at C' and C² at lower points, provision is made for the escape of every globule of air. Without the lower ones there may be liability that the air because of its friction with the rubber sheathing will not rise to the top orifice; but I have found that with a series of apertures practically every portion of the air is driven out. These escape-orifices are so minute that after the valve-tubes are withdrawn the exterior rubber sheathing closes practically tight and no harm results; but to prevent with assurance any such result after the filling has been completed and the material has set and hardened I vulcanize that part of the tire where the air-valves were and restore the integralness of the article.

What I claim is—

1. The herein-described process of manufacturing elastic vehicle-tires, it consisting in first forming a tube or sheathing of rubber, washing the interior of the said sheathing with formaldehyde or equivalent material, and then filling the said sheathing with a flowing viscid material capable of setting or hardening, said filling material being subjected to pressure while being introduced and simultaneously forcing the air from the interior of the said sheathing, substantially as set forth.

2. The herein-described method of manufacturing elastic vehicle-tires, it consisting in forming a tube or sheathing of rubber which is tire-like in shape when filled, forcing by pressure into the bottom part of said tire a fluid viscid material capable of setting or hardening, causing the filling material to rise in the said casing, simultaneously withdrawing the air from the upper part of the sheathing and subsequently closing the air-escape from the upper part of the sheathing, substantially as set forth.

3. The herein-described method of manufacturing elastic vehicle-tires, it consisting in forming a tube or sheathing of rubber, forcing by pressure into the bottom part of said tire a fluid viscid material capable of setting or hardening, forming air-apertures in the upper part of the periphery of said sheathing, pressing the filling material into the sheathing until it overflows at the said air-escapes, then vulcanizing the sheathing at the said air-space, substantially as set forth.

4. A vehicle-tire having an exterior rubber tube or sheathing and an elastic rubber-like filling material containing glue, glycerin, saccharin matter and formaldehyde, and compressed into incorporation with the inner surface part of the rubber sheathing, substantially as set forth.

In testimony whereof I affix my signature in presence of two witnesses.

CLARENCE DAWSON NIRDLINGER.

Witnesses:
THEO. W. MAETTEN,
ROBERT L. WINN.